(12) United States Patent
Choi et al.

(10) Patent No.: US 7,181,503 B2
(45) Date of Patent: Feb. 20, 2007

(54) APPARATUS AND METHOD OF SEARCHING FOR DNS SERVER IN OUTERNET

(75) Inventors: Hyun-seok Choi, Seoul (KR); Chul-min Kim, Suwon-si (KR); Young-geun Kim, Incheon Metropolitan (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 894 days.

(21) Appl. No.: 10/386,106

(22) Filed: Mar. 12, 2003

(65) Prior Publication Data

US 2003/0236779 A1   Dec. 25, 2003

(30) Foreign Application Priority Data

Jun. 22, 2002   (KR) .................... 10-2002-0035140

(51) Int. Cl.
*G06F 15/173* (2006.01)
(52) U.S. Cl. .................................... 709/218
(58) Field of Classification Search ........... 709/218, 709/223, 227, 219, 238, 245
See application file for complete search history.

(56) References Cited

U.S. PATENT DOCUMENTS

| | | | |
|---|---|---|---|
| 6,014,660 A * | 1/2000 | Lim et al. .................... 707/3 |
| 6,256,671 B1 * | 7/2001 | Strentzsch et al. .......... 709/227 |
| 6,324,585 B1 * | 11/2001 | Zhang et al. ................ 709/245 |
| 6,381,627 B1 * | 4/2002 | Kwan et al. ................. 709/201 |
| 6,526,450 B1 * | 2/2003 | Zhang et al. ................ 709/245 |
| 6,560,634 B1 * | 5/2003 | Broadhurst .................. 709/203 |
| 6,973,485 B2 * | 12/2005 | Ebata et al. ................. 709/219 |
| 7,010,585 B2 * | 3/2006 | Asami ......................... 709/220 |
| 7,099,957 B2 * | 8/2006 | Cheline et al. .............. 709/245 |

* cited by examiner

*Primary Examiner*—David Y. Eng
(74) *Attorney, Agent, or Firm*—Sughrue Mion, PLLC

(57) ABSTRACT

Outernet DNS searching units are included in a host, a DNS server, a router where a DNS server is registered, and a router where a DNS server is not registered, allowing Internet-enabled terminals to automatically search for a DNS server in an outernet. The host creates a DNS search message and transmits it to a subnet to which the host belongs so as to receive a response message. If no response message is received from the subnet (i.e., a DNS server is not connected to the subnet), the DNS search message is transmitted to an outernet to which the host does not belong, to which a DNS server is connected. Further, when a DNS server does not respond to a DNS search message from a host, a hop limit is increased to resend the DNS search message, thereby preventing waste of network bandwidth and easily detecting the closest DNS server.

42 Claims, 13 Drawing Sheets

APPARATUS AND METHOD OF SEARCHING FOR DNS SERVER IN OUTERNET

BACKGROUND OF THE INVENTION

This application claims the priority of Korean Patent Application No. 2002-35140, filed 22 Jun., 2002 in the Korean Intellectual Property Office, which is incorporated herein in its entirety by reference.

1. Field of the Invention

The present invention relates to an apparatus and method of allowing Internet-enabled information terminals to be directly connected to the Internet without setting a user in a subnet network, and more particularly, to an apparatus and method of automatically searching for a Domain Name System (DNS) server in an outernet for a network in which a DNS server is not present.

2. Description of the Related Art

When the address of a server using the Internet Protocol version 6 (IPv6) is obtained using the existing Dynamic Host Configuration Protocol (DHCP) method, a DHCP server sends the address together with information regarding a DNS server. Therefore, the address of the DNS server can be obtained during allocation of an information provider via the DHCP server. The DHCP refers to a protocol that enables central management and allocation of Internet Protocol (IP) addresses of network managers in a network of an organization. According to the Transmission Control Protocol/Internet Protocol (TCP/IP) of the Internet, only a computer having an inherent IP address can connect to the Internet. That is, each computer user belonging to an organization shall be allocated an identification IP address for his/her computer so as to connect to the Internet. Unless the DHCP method is used, an IP address must be manually input to each computer, and if a computer is moved to a different place connected to the network, the computer must be allocated with a new IP address. The DHCP method enables central management and allocation of IP addresses of a network manager, and automatic transmission of a new IP address to a computer moved to a different place connected to the network. The DNS is a system for changing the name of an Internet domain into its identification IP address that is used to detect the location of the Internet domain in the Internet. The name of an Internet domain refers to its Internet address allowing users to easily detect and remember the Internet domain. A digital IP address is required to detect the location of a computer on the Internet. The DNS server holds a database regarding domain names and their corresponding IP addresses and provides them to a computer requiring the database. When an IPv6 address is automatically created using a stateless address autoconfiguration method, a router in the same link periodically reports DNS information, and thus, the address of the DNS server can be obtained from the DNS information.

However, when an IPv6 address is automatically created using the conventional stateless address autoconfiguration method, it is impossible to automatically obtain the address of a DNS server using the conventional method if a DNS server is not present in a subnet. In other words, during autoconfiguration of the IPv6 address, the address of a DNS server can be easily detected using the conventional method only when the DNS server is present within a subnet.

SUMMARY OF THE INVENTION

To solve the above and other problems, the present invention provides an apparatus and method of automatically detecting the address of a (DNS) server in an outernet using the IPv6 global scope multicast address and the IPv6 subnet anycast address, when the DNS server is not present in a subnet.

According to one aspect of the present invention, there is provided an apparatus for searching for a DNS server in an outernet, the apparatus including a first outernet DNS searching unit included in a host. The first searching unit creating a DNS search message and transmitting it to a first subnet so as to receive a response message to the DNS search message, and the first searching unit transmitting the DNS search message to an outernet when the response message is not transmitted. The host belongs to the first subnet and does not belong to the outernet. The apparatus further includes a second outernet DNS searching unit included in a DNS server. The second searching unit creating a DNS register message, transmitting it to a second subnet to receive a response message to the DNS register message from a first router belonging to the second subnet, receiving a DNS search message related to the DNS server from the first router, and sending a response message to the DNS search message to the first router. The apparatus further includes a third outernet DNS searching unit included in a router where a DNS server is registered. The third searching unit receiving a DNS register message from the DNS server and registering the DNS server with the router, receiving a DNS search message from the second subnet, and transmitting the DNS search message to the registered DNS server. The apparatus further includes a fourth outernet DNS searching unit included in a router where a DNS server is not registered. The fourth searching unit receiving a DNS search message from a third subnet, transmitting the DNS search message with a hop limit to a third router belonging to the third subnet, and decreasing the hop limit by a predetermined value. A second router also belongs to the third subnet.

According to another aspect of the present invention, there is provided a method of searching for a DNS server on an outernet, the method including creating a DNS search message and transmitting it to a first subnet to which a host belongs so as to receive a response message to the DNS search message, and transmitting the DNS search message to an outernet to which the host does not belong so as to receive the response message; creating a DNS register message, transmitting it to a second subnet to which a DNS server belongs, receiving a response message to the DNS register message from a first router belonging to the second subnet, receiving a DNS search message related to the DNS server from the first router, and transmitting a response message to the DNS search message to the first router; receiving the DNS register message from the DNS server to register the DNS server to the first router, receiving a DNS search message from the second subnet, and transmitting the DNS search message to the registered DNS server; and receiving a DNS search message from a third subnet to which a second router belongs, transmitting the DNS search message with a hop limit to a third router, and decreasing the hop limit by a predetermined value.

BRIEF DESCRIPTION OF THE DRAWINGS

The above and other aspects and advantages of the present invention will become more apparent by describing in detail illustrative, non-limiting embodiments thereof with reference to the attached drawings in which.

DETAILED DESCRIPTION OF THE INVENTION

Figure 1:
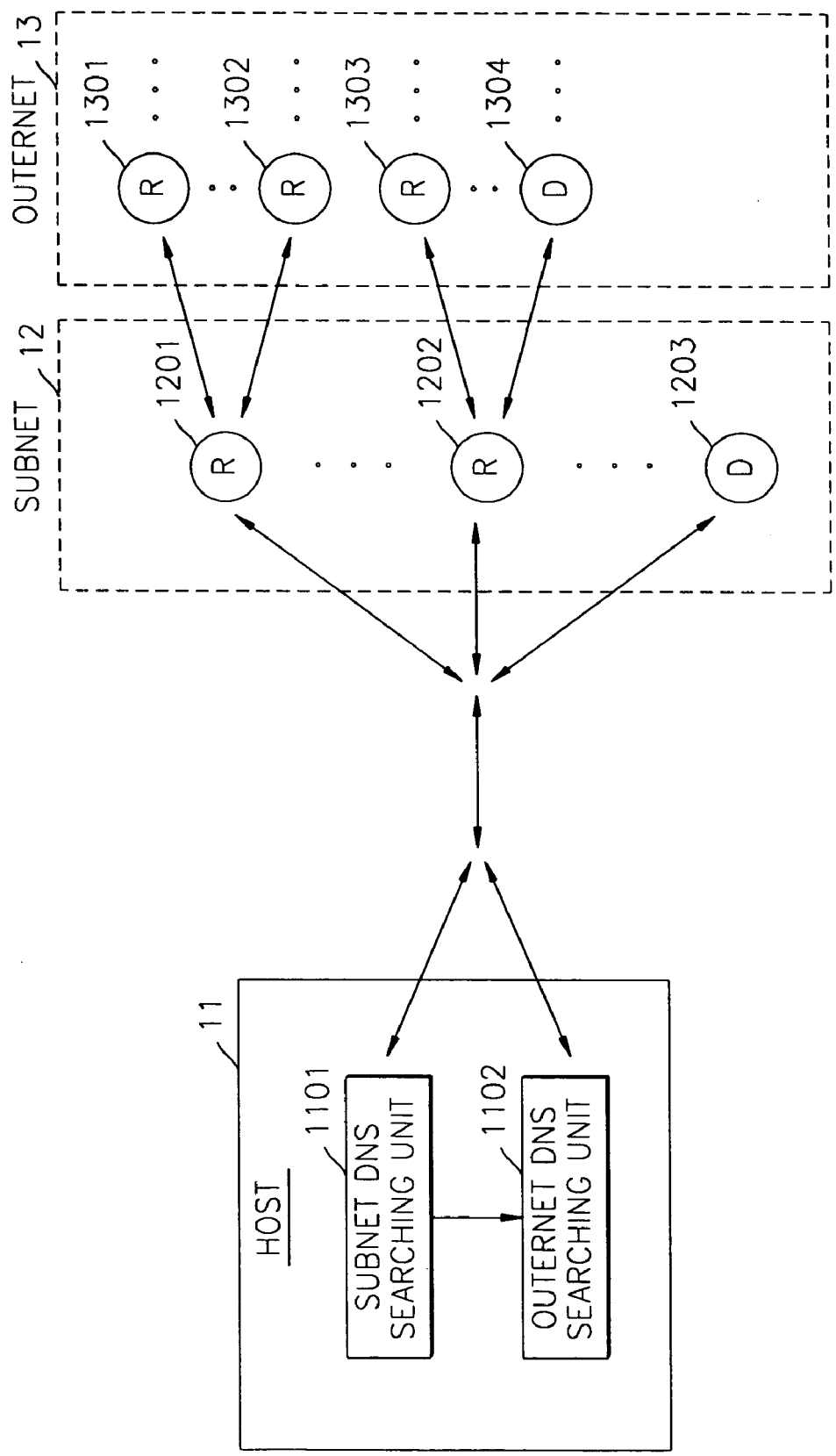
FIG. 1 is a diagram illustrating the structure of an outernet domain name system (DNS) searching apparatus of a host according to the present invention.

FIG. 1 is a diagram illustrating the structure of an outernet domain name system (DNS) searching apparatus of a host 11, according to the present invention. The apparatus includes a subnet DNS searching unit 1101 and an outernet DNS searching unit 1102.

The subnet DNS searching unit 1101 creates a DNS search message and transmits it to a subnet 12, to which the host 11 belongs, and further receives a response message to the DNS search message from the subnet 12. The subnet 12 includes at least one of routers 1201 and 1202 and at least one DNS server 1203 connected directly to the host 11.

Alternatively, the subnet 12 may be composed of only one router or one DNS server. When the subnet 12 consists of only one router, the subnet DNS searching unit 1101 can obtain information regarding the address of a DNS server (not shown) if the DNS server is registered with the router, i.e., the information is stored in a DNS server address database of the router. In this case, the subnet DNS searching unit 1101 creates a DNS search message and sends it to the subnet 12, to which the host 11 belongs, to receive a response message to the DNS search message. The response message contains the information regarding the address of the DNS server that is registered with the router. If the subnet 12 consists of only one DNS server 1203, it is possible to obtain the information directly from the DNS server 1203. If the subnet 12 consists of several routers and a DNS server is registered with some of the routers, the host 11 obtains the information regarding the address of the DNS server from the closest router. If the subnet 12 is composed of several DNS servers, the host 11 obtains the information directly from the closest DNS server. However, when the subnet 12 is composed of several routers but a DNS server is not registered with any of the routers, the host 11 cannot receive a response message to a DNS search message even if the subnet DNS searching unit 1101 creates the DNS search message and transmits it to the subnet 12 to which the host 11 belongs.

When the subnet DNS searching unit 1101 fails to receive any response message to the DNS search message, the outernet DNS searching unit 1102 transmits the DNS search message to an outernet 13, to which the host 11 does not belong, to receive a response message to the DNS search message. The outernet 13 includes at least one router 1301, 1302, or 1303 or at least one DNS server 1304 that is connected indirectly to the host 11. The indirect connection means that the connection of said at least one router 1301, 1302, or 1303 or said at least one DNS server 1304 to the host 11 requires the router 1201 or 1202 or the DNS server 1203 to be included in the subnet 12.

Alternatively, the outernet 13 may be formed of only one router or one DNS server. Although the outernet 13 consists of only one router, if a DNS server is registered with the router, i.e., information regarding the address of the DNS server is stored in a DNS server address database of the router, the DNS search message is transmitted to the outernet 13, to which the host 11 does not belong, so as to receive a response message thereof. In this manner, the host 11 obtains the information regarding the DNS server address, contained in the response message. When the outernet 13 consists of only one DNS server 1304, the host 11 obtains the information regarding the address of the DNS server 1304 directly from the DNS server 1304. If the outernet 13 consists of several routers and a DNS server is registered with some of the routers, the host 11 obtains the information from the closest router. If the outernet 13 is composed of several DNS servers, the host 11 obtains the information directly from the closest DNS server. However, when the outernet 13 is composed of several routers but a DNS server is not registered with any of the routers, the host 11 cannot receive a response message to the DNS search message even if the outernet DNS searching unit 1102 creates the DNS search message and transmits it to the outernet 13 to which the host 11 does not belong.

However, since an outernet is often established in a current network environment, the presence of a DNS server is guaranteed. Therefore, information regarding the address of a DNS server is certain to be obtained if the range of a hop limit is set to be sufficiently large.

Figure 2:
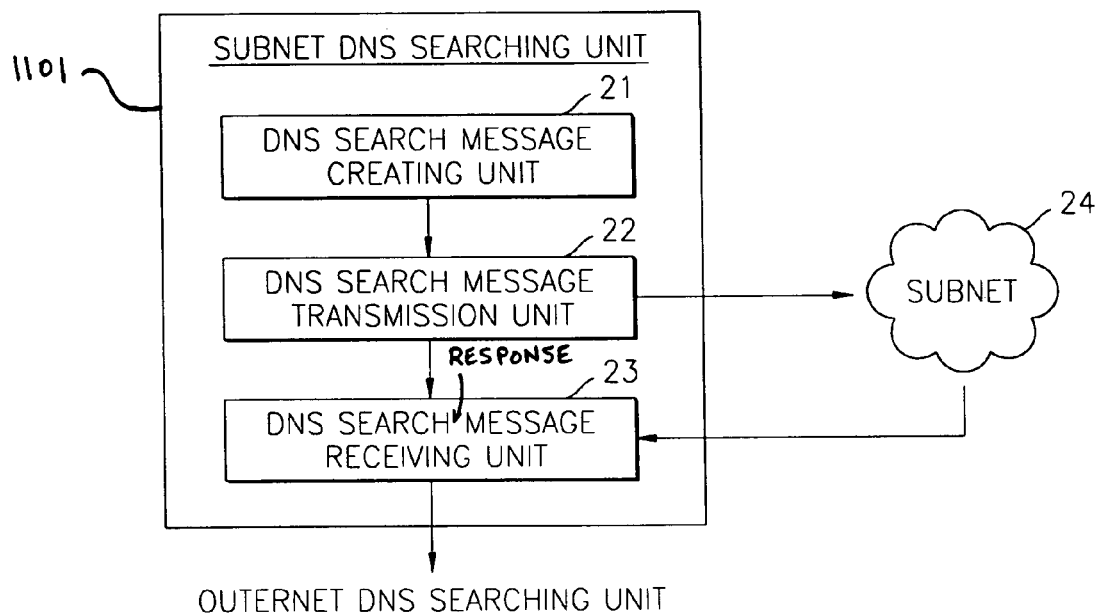
FIG. 2 is a diagram illustrating the structure of a subnet DNS searching unit of the apparatus of FIG. 1.

FIG. 2 is a diagram illustrating the structure of a subnet DNS searching unit of an outernet DNS searching apparatus of a host, according to the present invention. The subnet DNS searching unit includes a DNS search message creating unit 21, a DNS search message transmission unit 22, and a DNS search response message receiving unit 23.

The DNS search message creating unit 21 automatically creates the address of a transmitter and the DNS search message. In an IPv6 environment, an IP address may not only be allocated from a DHCP server in an IPv4 environment, but also, a host may automatically create its IP address by itself. The former method and the latter method are called "stateful address autoconfiguration" and "stateless address autoconfiguration", respectively, and are defined in the Request for Comments (RFC) 2462. The DHCP refers to a protocol that enables central management and allocation of IP addresses of network managers. According to the present invention, the address of a transmitter is automatically created by the DNS search message creating unit 21 using the stateless address autoconfiguration method under the IPv6 environment. In the case of the Internet Control Message Protocol version 6 (ICMPv6), an ICMP suitable for the IPv6 environment, the DNS search message is created by inputting the address of a transmitter to the field of a source address and the address of a receiving part, FF0E:0::XXXX, to the field of a destination field. In the address of a receiving part FF0E:0::XXXX, FF denotes a multicast address, 0 between FF and E denotes a permanent address, and 0 between the marks :: denotes a global address (refer to RFC 2375 for more details). The DNS search message transmission unit 22 multicasts the DNS search message to each node of the subnet 24. As previously mentioned, each node of the subnet 24 may be a router or a DNS server. The "multicast" refers to a manner of data transmission in which at least one transmitter (a host according to the present invention) transmits data to at least one particular receiving part (each node of a subnet according to the present invention). Inputting the address of a global scope multicast address, FF0E:0::XXXX, to the field of a destination address results in the multicast transmission of data.

The DNS search response message receiving unit 23 receives a response message to the DNS search message from any node of the subnet 24. As mentioned above, each node of the subnet 24 may be a router or DNS server. The response message to the DNS search message contains information regarding the address of a DNS server. Once the host obtains the information, i.e., the IP address, the host connects to the DNS server and is given domain name services.

Figure 3:
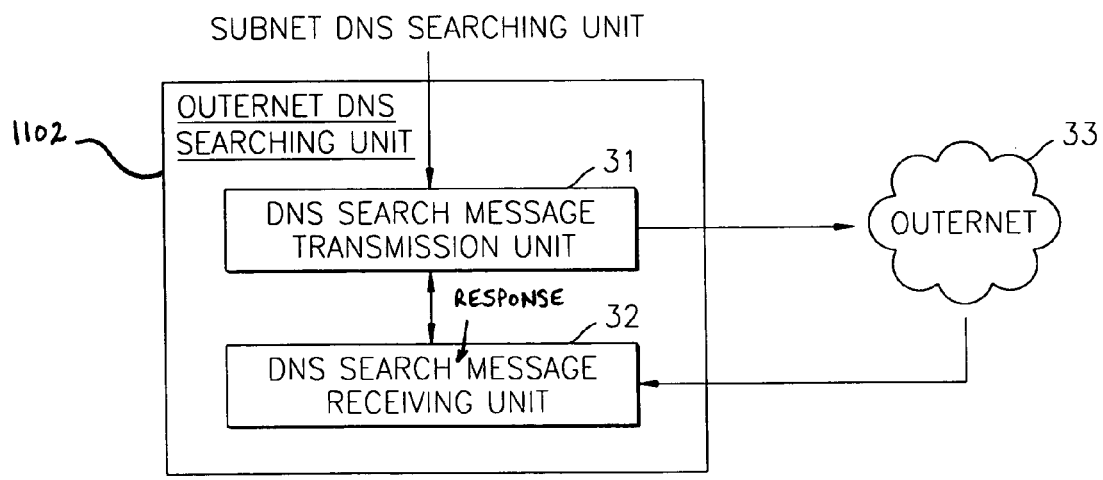
FIG. 3 is a diagram illustrating the structure of an outernet DNS searching unit of the apparatus of FIG. 1.

FIG. 3 is a diagram illustrating the structure of an outernet DNS searching unit of an outernet DSN searching apparatus of a host, according to the present invention. The outernet DNS searching unit includes a DSN search message transmission unit 31 and a DNS search response message receiving unit 32.

If the subnet DNS searching unit of FIG. 2 does not receive a response message, the DNS search message transmission unit 31 multicasts a DNS search message to each node of an outernet 33 until it receives a response message to its DNS search message. Like in the subnet 24, each node of the outernet 33 may be a router or a DNS server. Because a DNS server is present within the outernet 33, the DNS search message is repeatedly multicast to each node of the outernet 33 while gradually broadening a search region until the DNS server is detected, i.e., until a response message to the DNS search message is received.

The DNS search response message receiving unit 32 receives a response message from any node of the outernet 33. Like the subnet 24, the response message contains information regarding the address of a DNS server.

Figure 4:
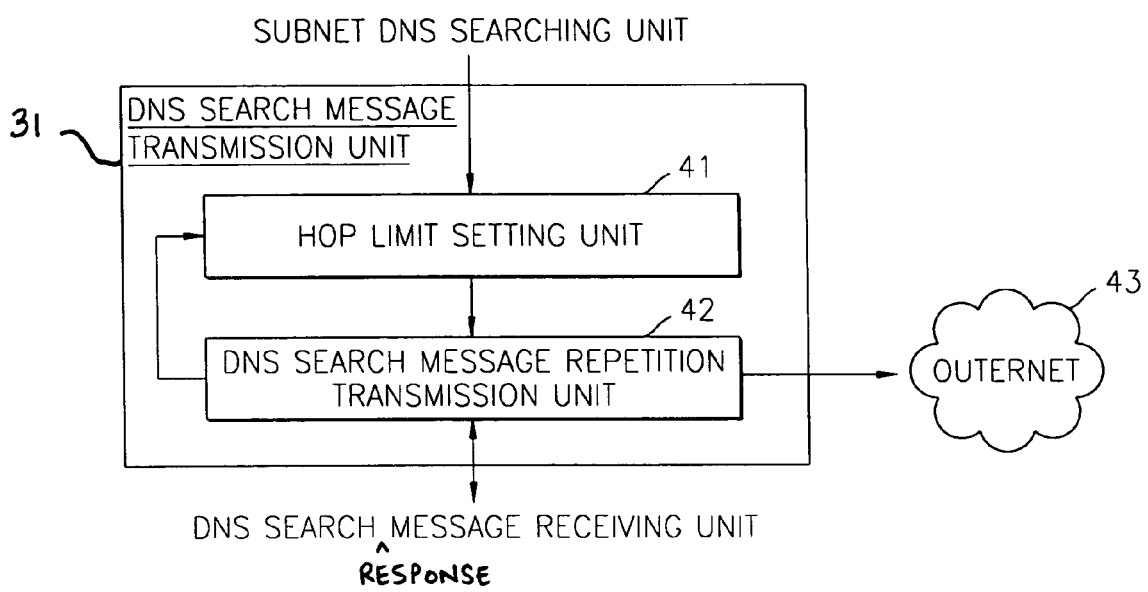
FIG. 4 is a diagram illustrating the structure of a DNS search message transmission unit of the outernet DNS searching unit of FIG. 3.

FIG. 4 is a diagram illustrating the structure of the DNS search message transmission unit of the outernet DNS searching unit of FIG. 3. Referring to FIG. 4, the DNS message transmission unit includes a hop limit setting unit 41 and a DNS search message repetition transmission unit 42.

The hop limit setting unit 41 repeatedly increases a currently set hop limit by a predetermined value whenever the outernet DNS searching fails to receive a response message to a DNS search message, in the event that the subnet DNS searching unit 1101 of FIG. 2 does not receive the response message. That is, the hop limit setting unit 41 resends the DNS search message while increasing the hop limit when a DSN server does not respond to the DNS search message transmitted from a host. As previously mentioned with reference to FIG. 3, the DNS search message is repeatedly multicast to each node of the outernet 33 while broadening a search area, until a DNS server is detected, i.e., the response message to the DNS search message is received. For repetitive multicast transmission of the DNS search message, a data packet of the DNS search message must be transmitted while increasing the hop limit whenever the DNS search message is transmitted. The hop limit corresponds to a time-to-live (TTL) value of the IPv4 environment. For example, when the hop limit is set to 3 and the DNS search message is multicast to the routers 1201 and 1202 of FIG. 1, the DNS search message is multicast to the outer routers 1301, 1302, 1303, and 1304 while reducing the hop limit by 1. When the hop limit is reduced to 0, multicast transmission of the DNS search message to adjacent routers is stopped. Two reasons why the hop limit is initially set to a small value and gradually increased during the multicast transmission are to prevent the waste of network bandwidth and to detect the closest DNS server. If the hop limit is initially set to a large value, the hop limit does not reach 0 and transmission of the DNS search message is not stopped until the DNS search message is passed through a lot of routers, thereby wasting time and network bandwidth.

The DNS search message repetition transmission unit 42 repeatedly multicasts the DNS search message to each node of the outernet 43 based on the set hop limit until the DNS search response message receiving unit receives a response message to the DNS search message. That is, until the host obtains information of the address of a certain DNS server, i.e., IP address, the DNS search message repetition transmission unit 42 repeatedly multicasts the DNS search message to each node of the outernet 43 based on the set hop limit. For example, if the set hop limit is 3, a DNS server is searched for while transmitting the DNS search message to pass through three routers with respect to one of several multicast transmission paths.

Figure 5:
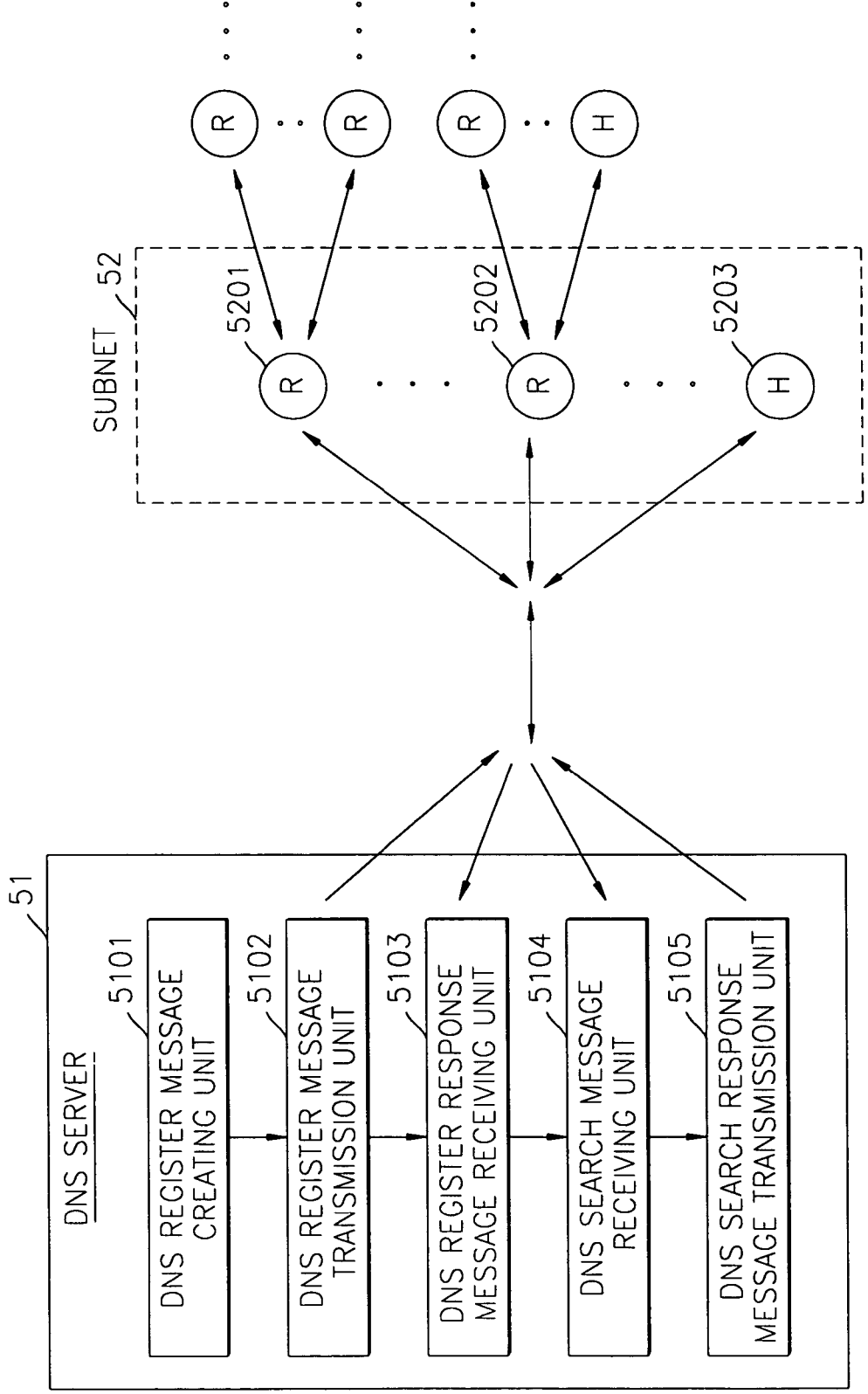
FIG. 5 is a diagram illustrating the structure of an outernet DNS searching apparatus of a DNS server according to the present invention.

FIG. 5 is a diagram of an outernet DNS searching apparatus included in a DNS server 51, according to the present invention. Referring to FIG. 5, the apparatus includes a DNS register message creating unit 5101, a DNS register message transmission unit 5102, a DNS register response message receiving unit 5103, a DNS search message receiving unit 5104, and a DNS search response message transmission unit 5105.

The DNS register message creating unit 5101 creates a DNS register message with the address of a certain DNS server as that of a transmitter. Like the DNS search message creating unit 21 of FIG. 2, the DNS register message creating unit 5101 automatically creates the address of a transmitter using the stateless address autoconfiguration method under the IPv6 environment. In the ICMPv6, an ICMP under the IPv6 environment, the address of a transmitter is input to a source address field and an anycast address is input to a destination address field to create the DNS register message. The DNS register message transmission unit 5102 transmits the DNS register message to a subnet 52 to which the DNS server 51 belongs. The subnet 52 includes a host 5203 or at least one router directly connected to the DNS server 51, and the host 5203 or each router becomes a node of the subnet 52. The DNS register message transmission unit 5102 anycasts the DNS search message to each node of the subnet 52. Here, "anycast" refers to a manner of data transmission in which a single transmitter (the DNS server 51 according to the present invention) transmits data to some of the closest receiving parts within the subnet 52 (routers according to the present invention). Therefore, according to IPv6, it is possible to detect the closest receiving part and transmit a data packet to the receiving part, which is similar to a unicast transmission method. As described above, input of an anycast address in the destination address field results in an anycast transmission of data. The DNS register response message receiving unit 5103 receives a response message in response to the DNS register message from one of routers 5201 and 5202 belonging to the subnet 52. The one of the routers 5201 and 5202 refers to the first router that responds to the DNS register message, i.e., the closest router. Upon receiving the response message, one-to-one communication is made between the DNS server 51 and the router nearest to the DNS server 51 as in the unicast method. The response message to the DNS register message contains information that the DNS server 51 is normally registered with the nearest router, i.e., information that the IP address of the DNS server 51 is completely stored in a database of the router. The DNS search message receiving unit 5104 receives a DNS search message from the nearest router. The nearest router refers to one where the DNS server 51 is registered, and thus, the IP address of the DNS server 51 can be detected via the router to transmit the DNS search message to the DNS server 51. The DNS search response message transmission unit 5105 transmits the response message to the DNS search message to the router. The response message contains information regarding the address of the DNS server 51, i.e., the IP address of the DNS server 51.

Figure 6:
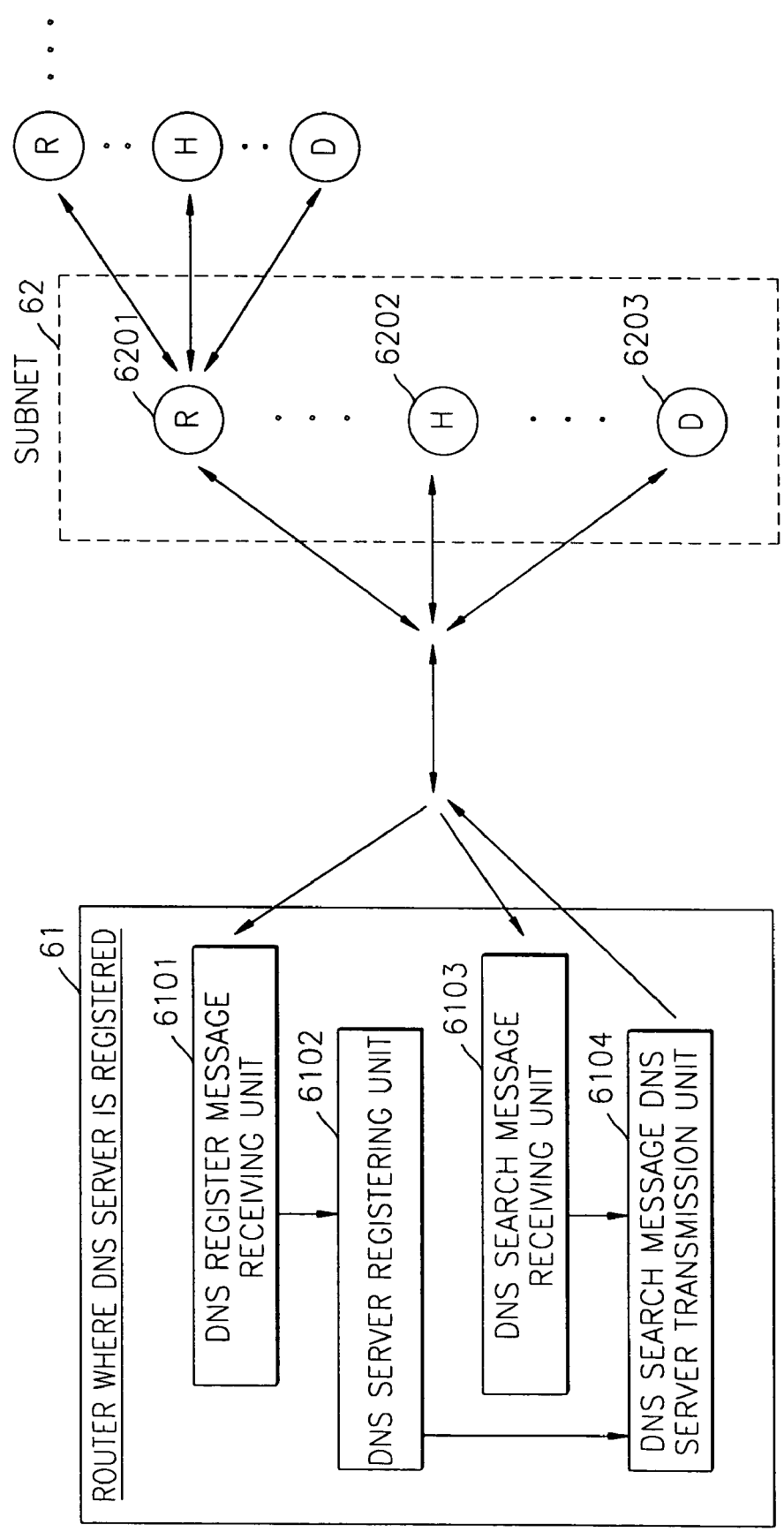
FIG. 6 is a diagram illustrating the structure of an outernet DNS searching apparatus of a router where a DNS server is registered.

FIG. 6 is a diagram of an outernet DNS searching apparatus included in a router 61 where a DNS server is registered, according to the present invention. Referring to FIG. 6, the apparatus includes a DNS register message receiving unit 6101, a DNS server registering unit 6102, a DNS search message receiving unit 6103, and a DNS search message DNS server transmission unit 6104.

The DNS register message receiving unit 6101 receives a DNS register message from a subnet 62 to which a certain router belongs. The subnet 62 includes a host 6202, at least one router 6201, or at least one DNS server 6203, which is connected directly to the router 61. The DNS register message is transmitted from the DNS server 6203 using the anycast method, and thus, said certain router is the router nearest to the DNS sever 6203. The DNS server registering unit 6102 registers the DNS server 6203 related to the DNS register message with the router. In general, registration of the DNS server 6203 is performed by storing its IP address in an IP address database of the router 61. The DNS search message receiving unit 6103 receives a DNS search message from the subnet 62. If the host 6202 is included in the subnet 62, the DNS search message is transmitted directly from the host 6202 to the DNS search message receiving unit 6103.

If the host 6202 is not included in the subnet 62, the DNS search message is passed through several routers based on a set hop limit and sent to the DNS search message receiving unit 6103 from a router nearest to the DNS server 6203. The DNS search message DNS server transmission unit 6104 transmits the DNS search message to the registered DNS server 6203. For one-to-one connection of the host 6202 and the DNS server 6203 to convert a domain name into an IP address, the DNS search message DNS server transmission unit 6104 transmits the DNS search message to the registered DNS server 6203.

Figure 7:
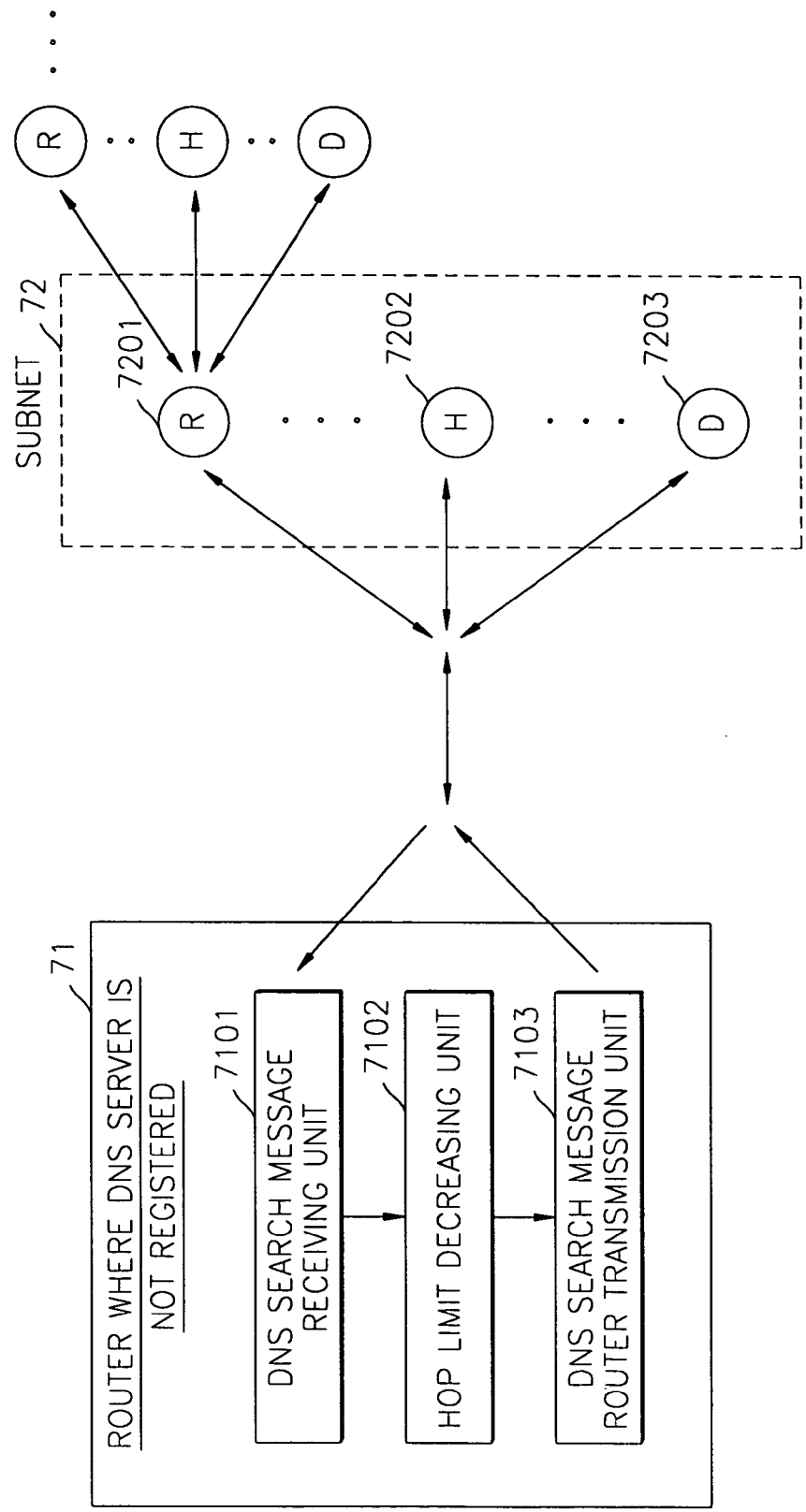
FIG. 7 is a diagram illustrating the structure of an outernet DNS searching apparatus of a router where a DNS server is not registered.

FIG. 7 is a block diagram of an outernet DNS searching apparatus included in a router 71 where a DNS server is not registered, according to the present invention. The apparatus includes a DNS search message receiving unit 7101, a hop limit decreasing unit 7102, and a DNS search message router transmission unit 7103.

The DNS search message receiving unit 7101 receives a DNS search message from a subnet 72 to which a certain router belongs. The subnet 72 includes a host 7202, at least one router 7201, or at least one DNS server 7203 that is connected directly to the router 71. If the subnet 72 includes the host 7202, the DNS search message is transmitted directly from the host 7202, and otherwise, the DNS search message is passed through several routers based on a hop limit and transmitted to the certain router. The hop limit decreasing unit 7102 decreases the hop limit for the DNS search message by a predetermined value. In general, the predetermined value is set to 1. For instance, if the hop limit is set to 3, it decreases by 1 whenever the DNS search message passes through a router, until it finally becomes 0. When the hop limit is 0, the DNS search message is not transmitted to any further routers.

The DNS search message router transmission unit 7103 transmits the DNS search message to another router belonging to the subnet 72 while reducing the hop limit. In general, a subnet includes nodes connected directly to a certain router. Subnets may form a new subnet at a border region between subnets, and in this case, the overall net can be formed of a plurality of subnets since they are connected to one another. Therefore, if the range of a hop limit is set to be sufficiently broadly, all nodes of the overall net can be searched.

Figure 8:
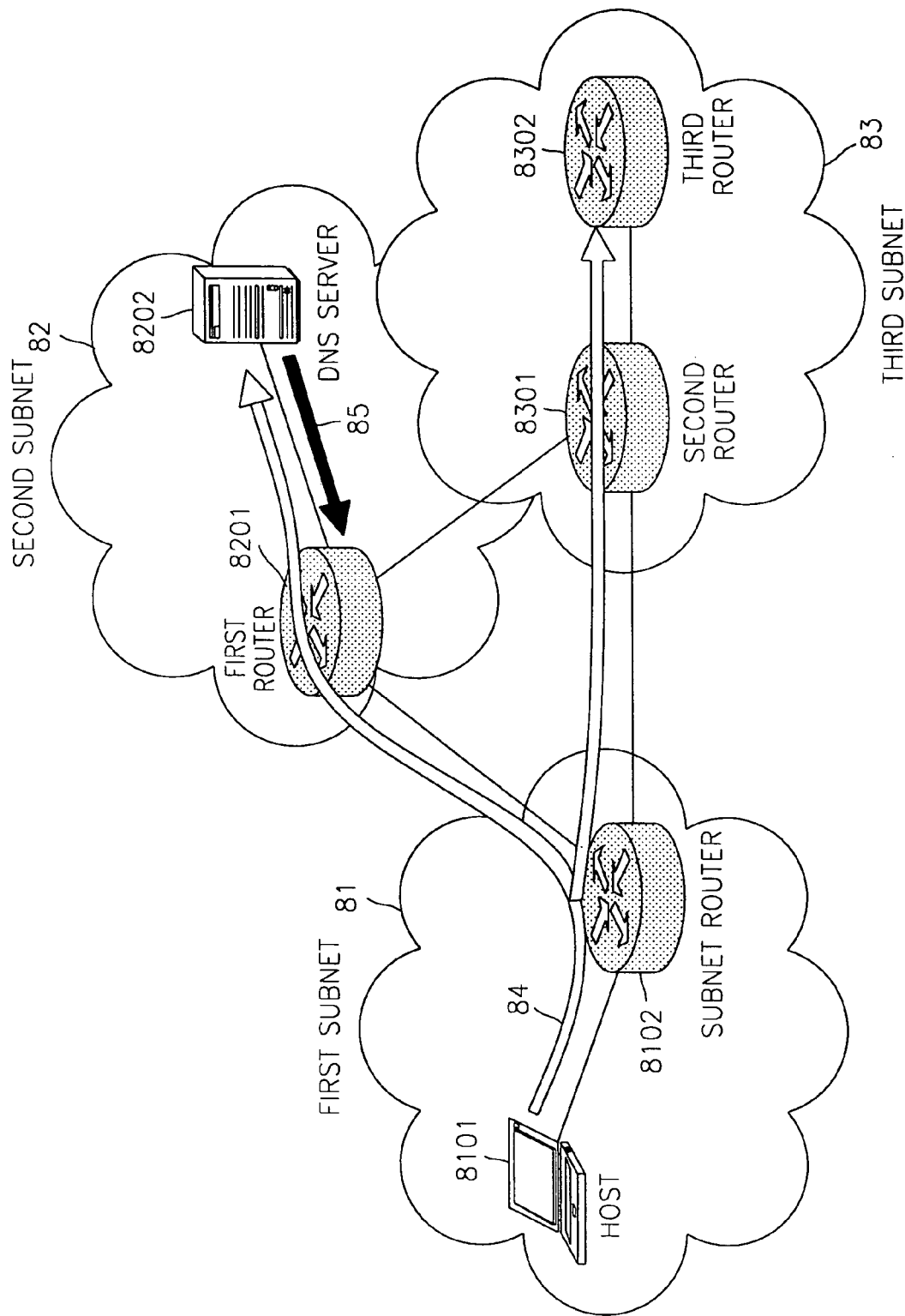
FIG. 8 is a diagram illustrating the overall structure of an apparatus for searching for a DNS server in an outernet.

FIG. 8 is a diagram illustrating an apparatus for searching for a DNS server in an outernet, the apparatus to which an outernet DNS searching apparatus of a host 8101, an outernet DNS searching apparatus of a DNS server 8202, an outernet DNS searching apparatus of a first router 8201 where a DNS server is registered, and an outernet DNS searching apparatus of a second router 8301 where no DNS server is registered, are connected.

The outernet DNS searching apparatus of the host 8101 creates a DNS search message and transmits it to a first subnet 81, to which the host belongs, to receive a response message to the DNS search message. If the first subnet 81 does not send a response message, the outernet DNS searching apparatus of the host 8101 creates a DNS search message and transmits it to a second subnet 82 and a third subnet 83, to which the host does not belong, to receive a response message to the DNS search message. The outernet DNS searching apparatus of the DNS server 8202 creates a DNS search message and transmits it to the second subnet 82, to which a certain DNS server belongs, so as to receive a response message to the DNS search message from the first router 8201 belonging to the second subnet 82. Also, the outernet DNS searching unit of the DNS server 8202 receives the DNS search message related to the DNS server

8202 from the first router 8201 and transmits a response message to the DNS search message to the first router 8201. The outernet DNS searching apparatus of the first router 8201 where the DNS server is registered, receives the DNS register message from the DNS server 8202 and registers the DNS server 8202 with the first router 8201. Also, the outernet DNS searching apparatus of the first router 8201 receives a DNS search message from the second subnet 82 and transmits it to the registered DNS server 8202. The outernet DNS searching apparatus of the second router 8301 where a DNS server is not registered, receives a DNS search message from a third subnet 83 to which a second router 8301 belongs, and transmits it to the third router 8302, which also belongs to the third subnet 83, while decreasing a hop limit by a predetermined value. Before the DNS search message is sent to the third router 8302, the DNS search message has already been sent to the second router 8301 from the subnet router 8102 belonging to the first subnet 81, and therefore, the hop limit decreases by 2 when the DNS search message is transmitted to the third router 8302. The subnet router 8102 belonging to the first subnet 81 and the second router 8301 belonging to the third subnet 83 are overlapped with each other to form a new subnet. In FIG. 8, the subnets 81 to 83 are set centering on the host 8101, but this is not a hard restriction. That is, according to the present invention, nodes connected directly to one another may function as subnets.

Figure 9:
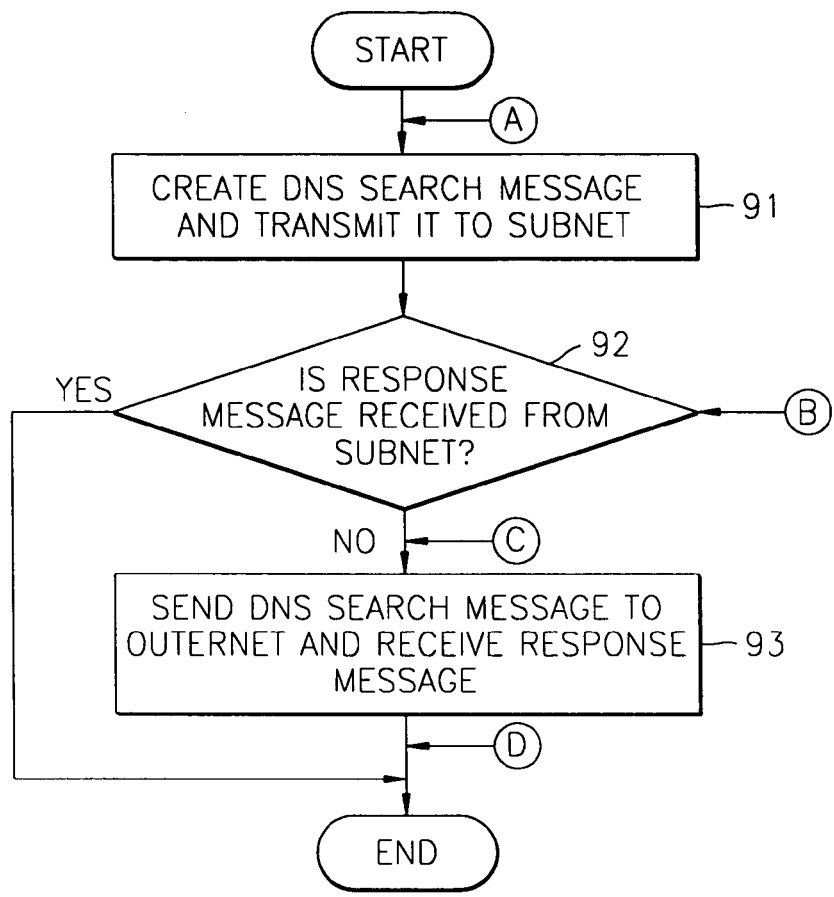
FIG. 9 is a flow chart illustrating a method performed by a host, for searching for a DNS server in an outernet, according to the present invention.

FIG. 9 is a flow chart illustrating a method of searching for a DNS server of a host in an outernet, according to the present invention. Referring to FIG. 9, first, a DNS search message is created and transmitted to a subnet belonging to a certain host to receive a response message to the DNS search message, in step 91. Next, it is checked if the response message is received from the subnet in step 92. If it is determined in step 92 that the response message is not received from the subnet, the DNS search message is sent to an outernet to which the host does not belong and the response message to the sent DNS search message is received from the outernet, in step 93. If it is determined in step 92 that the response message is received from the subnet, it means information regarding the address of a desired DNS server has been obtained. Therefore, the method of FIG. 9 is terminated. The subnet includes at least one router or at least one DNS server connected directly to the host.

Figure 10:
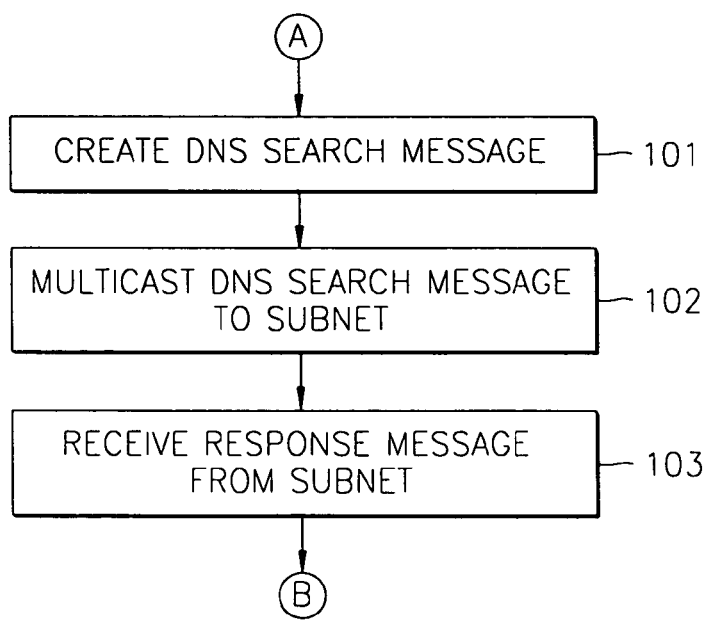
FIG. 10 is a flow chart illustrating a method of searching for a DNS server in a subnet, which is a part of the method of FIG. 9, according to the present invention.

FIG. 10 is a flow chart illustrating a method of searching for a DNS server of a host in a subnet, which is a part of the method of FIG. 9, according to the present invention. Referring to FIG. 10, first, the address of a transmitter is automatically created to create a DNS search message in step 101. Next, the DNS search message is transmitted to each node of the subnet, using a multicast method, in step 102. After step 102, a response message to the DNS search message is received from any node of the subnet in step 103.

Figure 11:
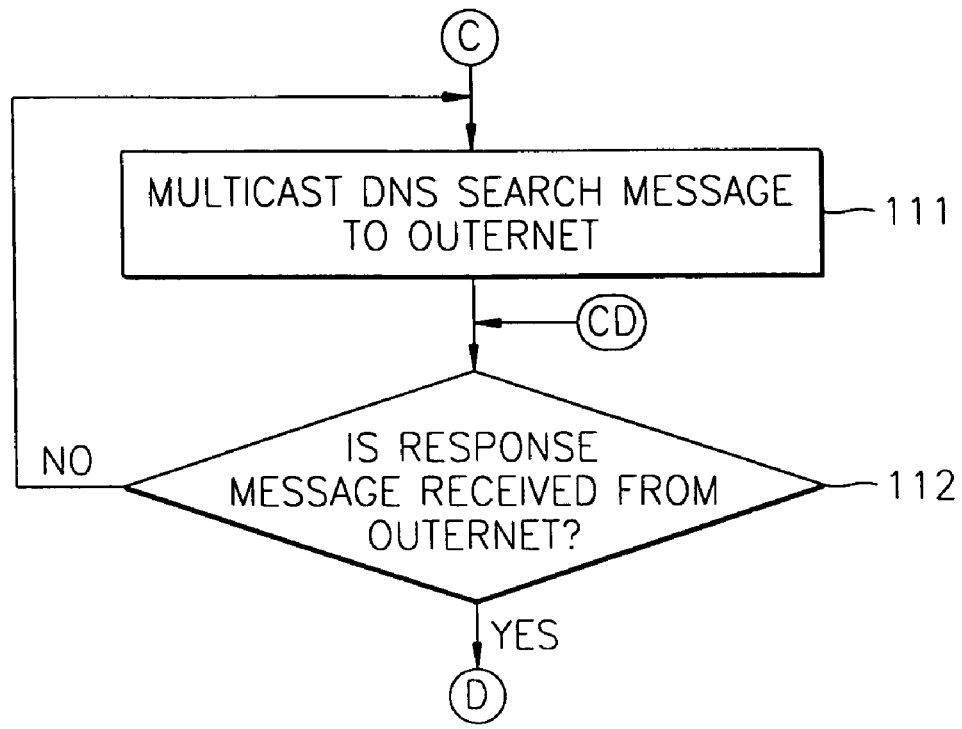
FIG. 11 is a flow chart illustrating a method of searching for a DNS server in an outernet, which is a part of the method of FIG. 9, according to the present invention.

FIG. 11 is a flow chart illustrating a method of searching for a DNS server of a host in an outernet, which is a part of the method of FIG. 9, according to the present invention. First, when a response message to the DNS search message is not provided by the subnet, the DNS search message is repeatedly multicast transmitted to each node of the outernet until a response message to the DNS search message is transmitted, in step 111. After step 111, it is checked if response messages are sent from any node of the outernet in step 112. If it is determined in step 112 that a response message is not sent from any node of the outernet, the operation returns back to step 111 and the DNS search message is multicast transmitted to each node of the outernet in step 111. This is repeated until a response message to the DNS search message is created. Here, the outernet includes at least one router or at least one DNS server connected indirectly to the host.

Figure 12:
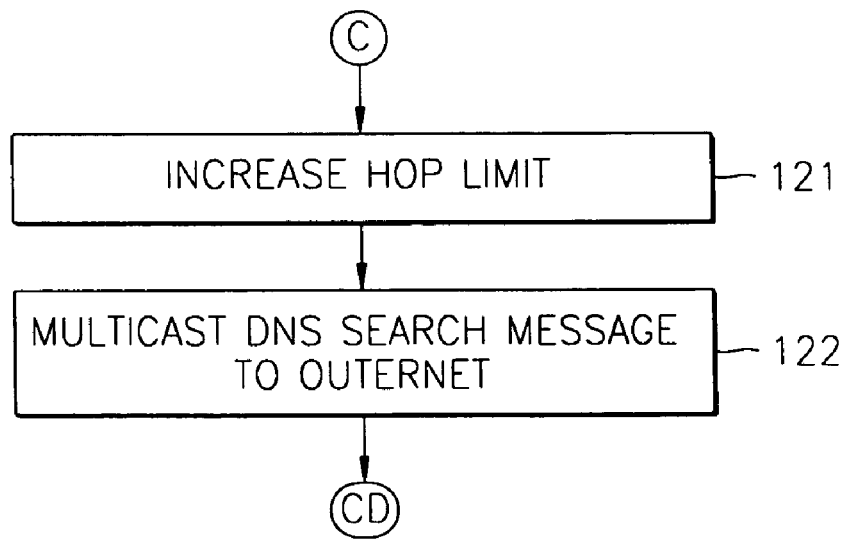
FIG. 12 is a flow chart illustrating a method of transmitting a DNS search message, which is included in the method of FIG. 11.

FIG. 12 is a flow chart illustrating an operation for transmitting a DNS search message, which is included in the operation of FIG. 11. Referring to FIG. 12, first, a currently set hop limit is increased by a predetermined value whenever a response message to a DNS search message is not made, in step 121. After step 121, the DNS search message is repeatedly multicast transmitted to each node of an outernet, based on the set hop limit, until a response message is transmitted, in step 122.

Figure 13:
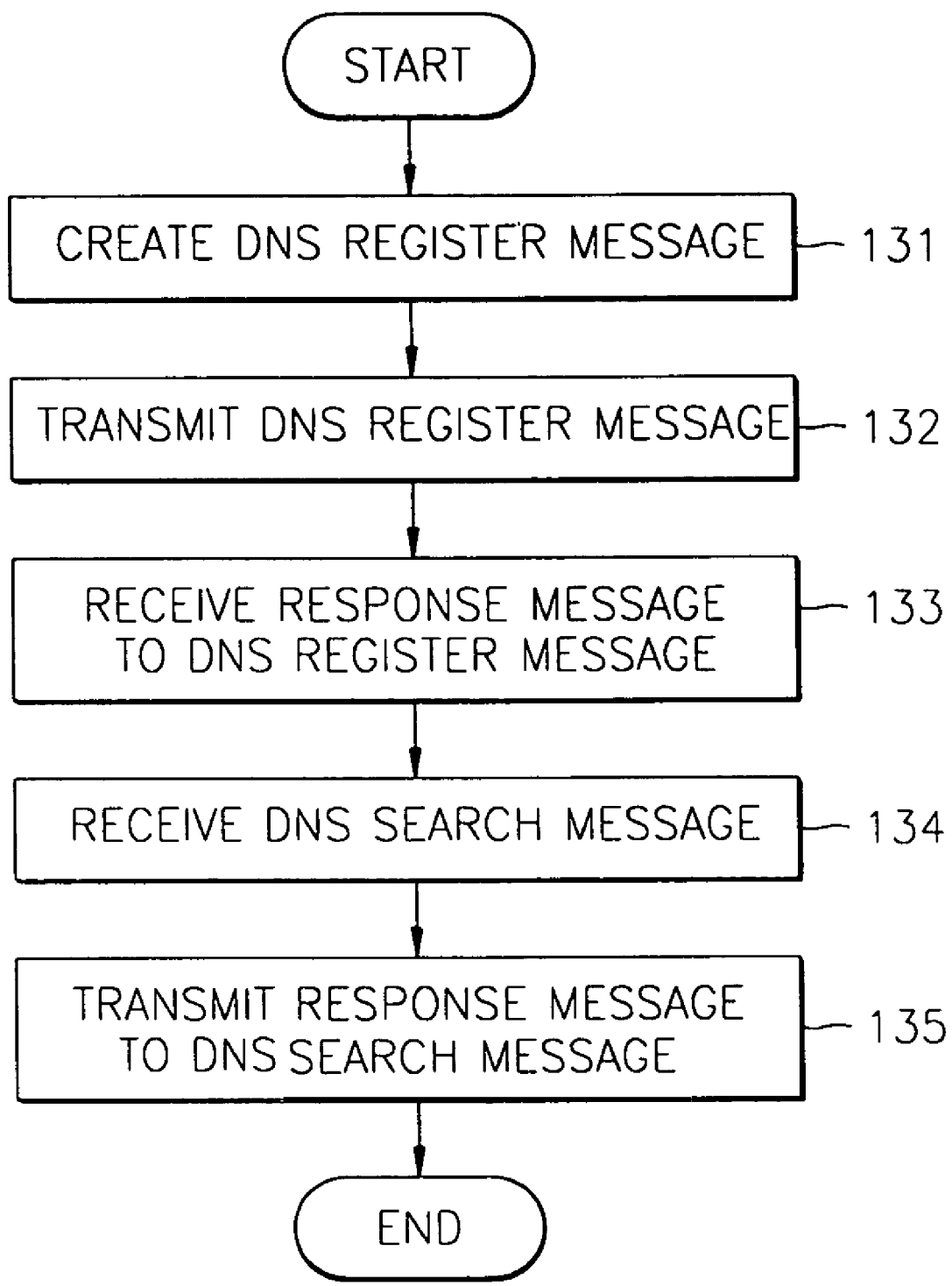
FIG. 13 is a flow chart illustrating a method performed by a DNS server, for searching for the DNS server in an outernet, according to the present invention.

FIG. 13 is a flow chart illustrating a method of searching for a DNS server in an outernet, the method performed by an outernet DNS searching apparatus included in a DNS server, according to the present invention. First, a DNS register message is created with the address of a DNS server as the address of a transmitter in step 131. Next, the DNS register message is transmitted to a subnet to which the DNS server belongs in step 132. In this case, the subnet includes a host or at least one router connected directly to the DNS server, and an anycast transmission is used to transmit the DNS search message to each node of the subnet. After step 132, a response message to the DNS register message is received from a router belonging to the subnet in step 133. In this case, the router becomes a router where the DNS server is registered. After step 133, a DNS search message is transmitted to the DNS server from the router in step 134, which is possible since an IP address of the DNS server is stored in the router. After step 134, the DNS server sends a response message to the DNS search message to the router in step 135.

Figure 14:
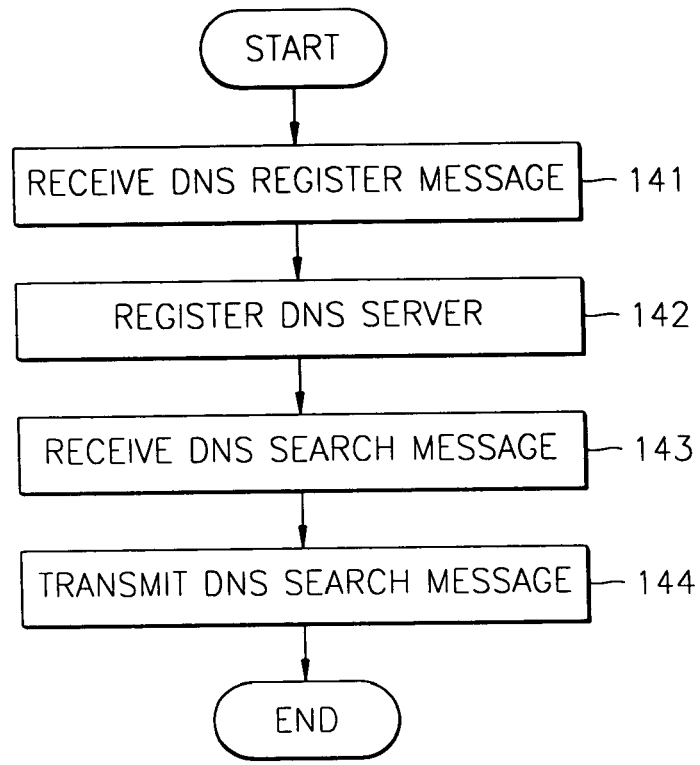
FIG. 14 is a flow chart illustrating a method of searching for a DNS server in an outernet, the method performed by a router where a DNS server is registered, according to the present invention.

FIG. 14 is a flow chart illustrating a method of searching for a DNS server in an outernet, the method performed by a router where the DNS server is registered, according to the preset invention. Referring to FIG. 14, first, a DNS register message is received from a subnet to which a router belongs in step 141. The subnet includes a host, at least one router, or at least one DNS server connected directly to the router. After step 141, a DNS server, which transmitted the DNS register message to the subnet, is registered with the router in step 142. As mentioned with reference to FIG. 13, the DNS server is the transmitter of the DNS register message. After step 142, a DNS search message is transmitted from the subnet in step 143, and the router, where the DNS server has been registered, transmits the DNS search message to the registered DNS server, in step 144.

Figure 15:
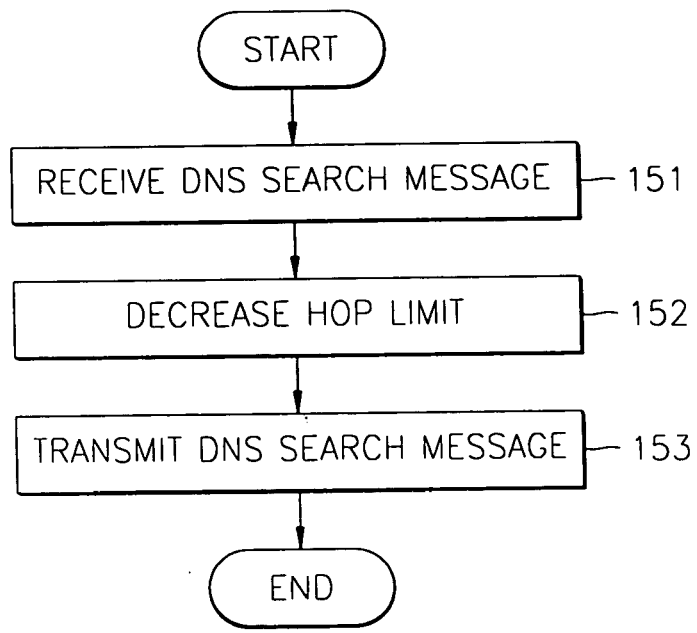
FIG. 15 is a flow chart illustrating a method of searching for a DNS server in an outernet, the method performed by a router where a DNS server is not registered, according to the present invention.

FIG. 15 is a flow chart illustrating a method of searching for a DNS server in an outernet, the method performed by a router where a DNS server is not registered, according to the present invention. First, a DNS search message is received from a subnet to which a router belongs in step 151. The subnet includes a host, at least one router, or at least one DNS server, which is connected directly to the router. After step 151, a hop limit for the DNS search message is decreased by a predetermined value in step 152. Next, since a DNS server is not registered with the router, the router sends the DNS search message with the decreased hop limit to another router belonging to the subnet, in step 153. This is repeated while increasing the hop limit until the DNS search message is transmitted to a router where a DNS server is registered.

Figure 16:
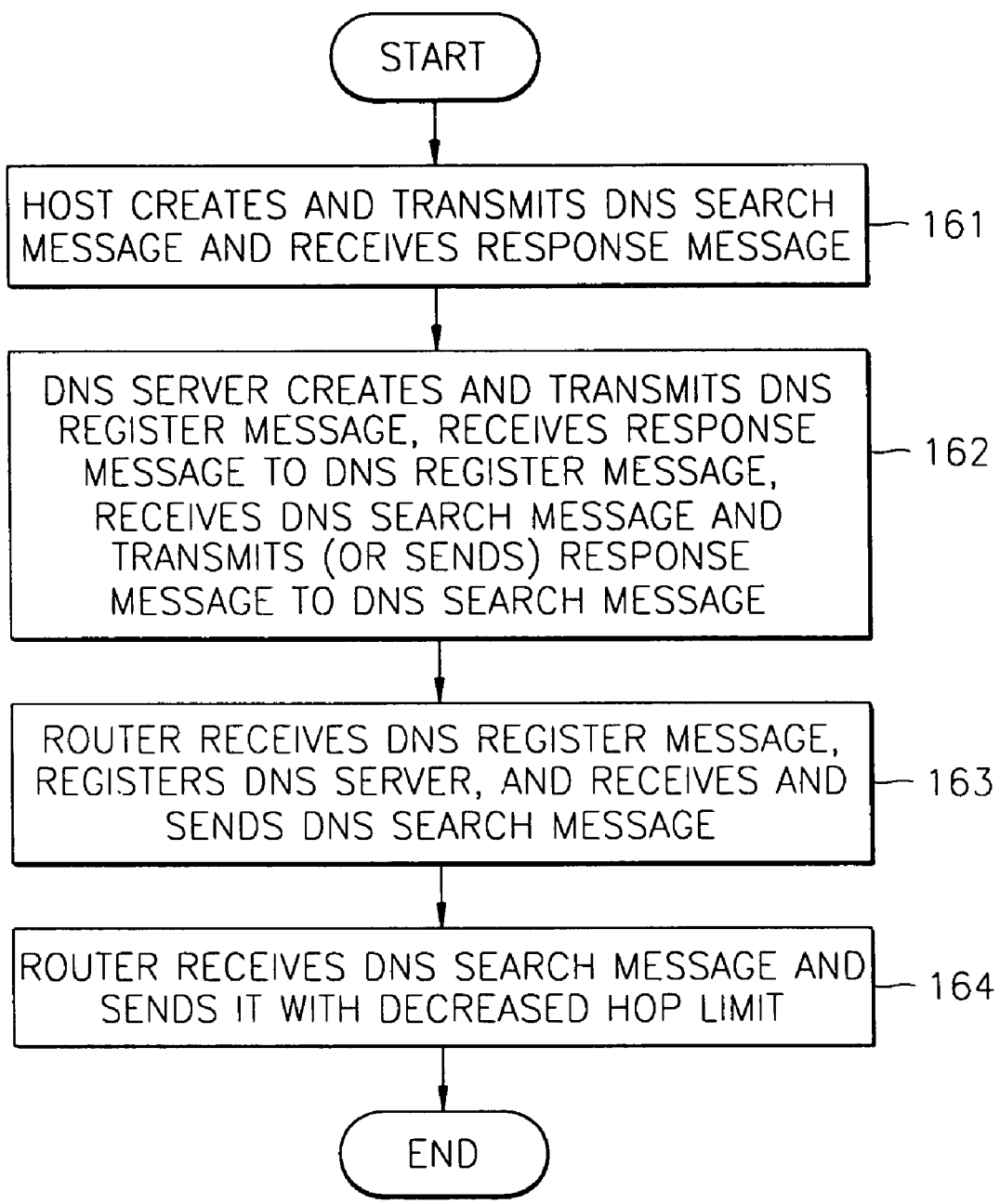
FIG. 16 is an overall flow chart illustrating a method of searching for a DNS server in an outernet.

FIG. 16 is a flow chart illustrating a method of searching for a DNS server in an outernet, the method performed by a host, a DNS server, a router where the DNS server is registered, and a router where the DNS server is not registered. Referring to FIG. 16, in step 161, a DNS search message is created and transmitted to a first subnet, to which a host belongs, so as to receive a response message to the DNS search message, and the DNS search message is transmitted to an outernet to which the host does not belong when a response message is not received. After step 161, a DNS register message is created and transmitted to a second subnet, to which a DNS server belongs, to receive a response message thereof from a first router connected to the second subnet, and the DNS search message with respect to the DNS server is received from the first router and a response message thereof is sent to the first router, in step 162. After step 162, the DNS register message is received from the DNS server to register the DNS server with the first router, and the DNS search message is received from the second subnet to transmit the DNS search message to the registered DNS server, in step 163. After step 163, the DNS search message is received from a third subnet to which a second router belongs, and the DNS search message is transmitted along with a hop limit, which is decreased by a predetermined value, to a third router belonging to the third subnet, in step 164.

Figure 17:
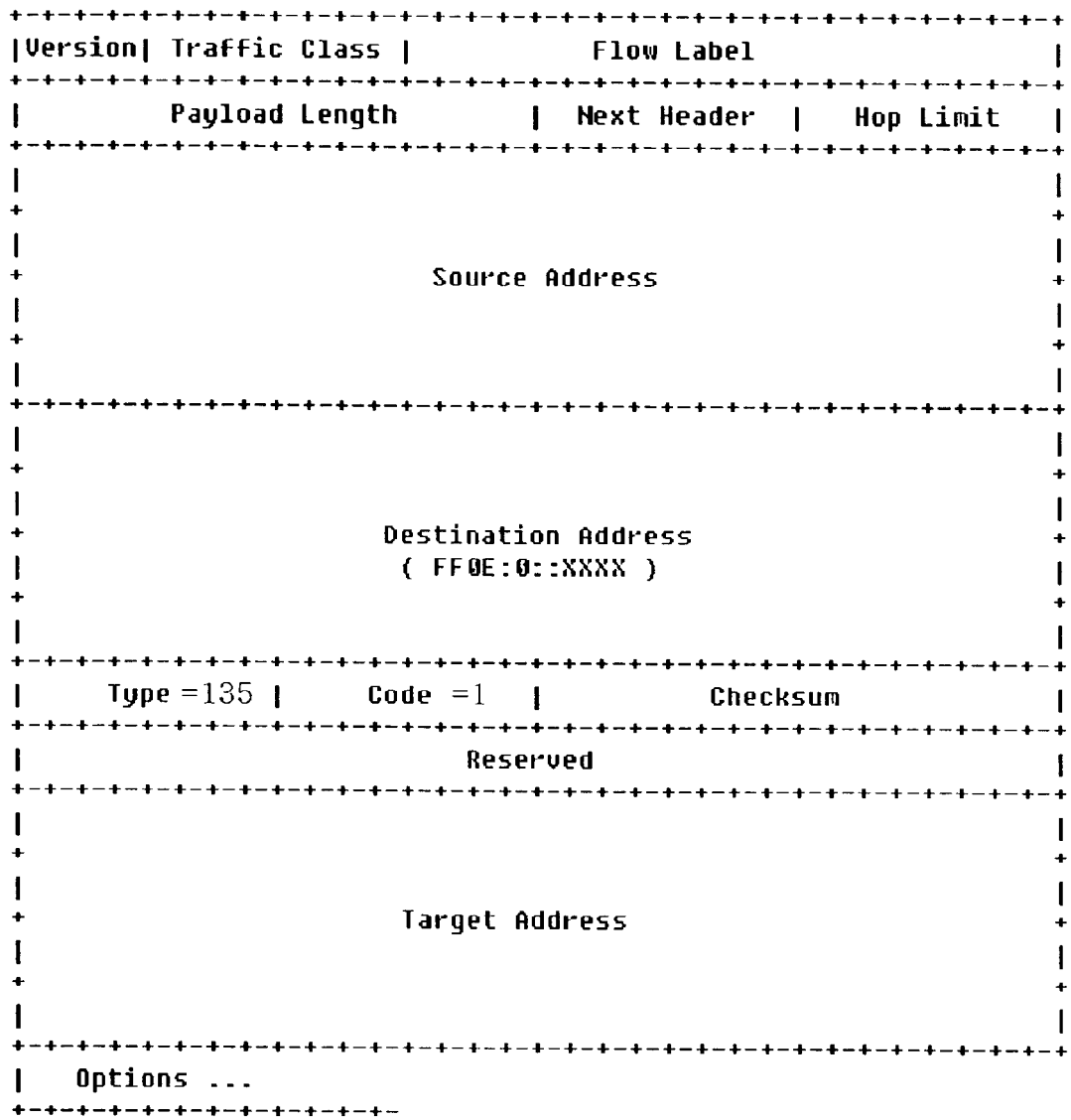
FIG. 17 is a view of one example of a DNS search message.

FIG. 17 is a view of one example of a DNS search message used in the present invention. The DNS search message is a modified one of a neighbor solicitation message prescribed in RFC 2463. The DNS search message adopts an ICMP type 135, and is used to determine the address of a link layer of an adjacent node. Referring to FIG. 17, a global scope multicast address, e.g., FFOE:0::1, is defined in the field of a destination address. A code field of an ICMP header is set to 1 in the present invention, whereas it is set to 0 in a conventional DNS search message. If the code field is set to 1, the router decreases a hop limit by 1 and transmits the DNS search message with the decreased hop limit to the other routers, using multicast transmission method.

Figure 18:
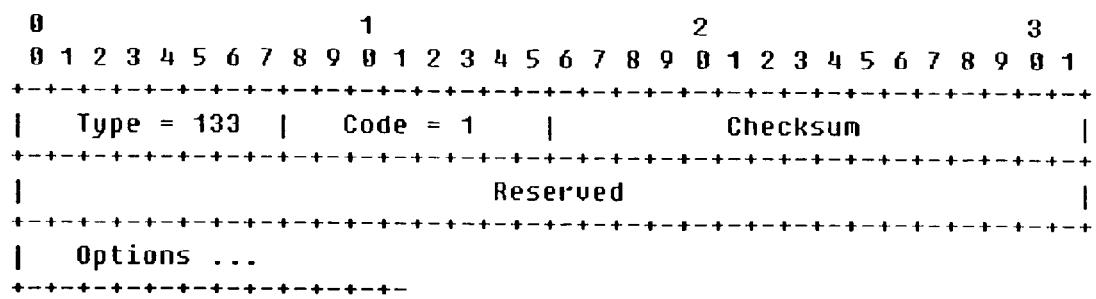
FIG. 18 is a view of another example of a DNS search message.

FIG. 18 is a view of another example of a DNS search message according to the present invention. The address of a DNS server is registered with a router belonging to a subnet, to which the DNS server also belongs, using a router solicitation message. The router manages lists of the addresses of DNS servers and sends a neighbor solicitation message to a DNS server upon receiving a message instructing to search for the DNS server. Referring to FIG. 18, global subnet anycast address is defined in a destination address field, and a code field of an ICMP header is set to 1 (the code field is set to 0 in a conventional DNS search message). If the code field is set to 1, the router decreases a hop limit by 1 and transmits the DNS search message with the decreased hop limit to the other routers. In the event that a router nearest to said router responds to DNS search message, a one-to-one communication is made between the DNS server and the closest router, using a unicast transmission method.

The present invention can be embodied as a computer readable code in a computer readable medium. Here, the computer readable medium may be any recording apparatus capable of storing data that can be read by a computer system, e.g., a read-only memory (ROM), a random access memory (RAM), a compact disc (CD)-ROM, a magnetic tape, a floppy disk, an optical data storage apparatus, and so on. Also, the computer readable medium may be a carrier wave that transmits data via the Internet, for example. The computer readable recording medium can be remotely installed in a computer system connected to a network, and stored and accomplished as a computer readable code by a distributed computing environment.

While this invention has been particularly shown and described with reference to preferred embodiments thereof, it will be understood by those skilled in the art that various changes in form and details may be made therein without departing from the spirit and scope of the invention as defined by the appended claims.

As described above, according to the present invention, a host creates a DNS search message and transmits it to a subnet to which the host belongs so as to receive a response message to the DNS search message. If no response message is sent from the subnet, the DNS search message is again transmitted to an outernet to which the host does not belong. Therefore, when a DNS server is not connected to the subnet, it is possible to automatically search for a DNS server connected to an outernet. Further, when a DNS server does not respond to a DNS search message from a host, a hop limit is increased to resend the DNS search message, thereby preventing waste of bandwidth of network and easily detecting the closest DNS server.

What is claimed is:

1. An apparatus, which is included in a host, for searching for a DNS server in an outernet, comprising:
   a subnet DNS searching unit for creating a DNS search message, transmitting the DNS search message to a subnet to which the host belongs, and receiving a response message to the DNS search message; and
   an outernet DNS searching unit for transmitting the DNS search message to an outernet to which the host does not belong and receiving a response message to the DNS search message, when the subnet DNS searching unit fails to receive the response message.

2. The apparatus of claim 1, wherein the subnet comprises at least one router or at least one DNS server, connected directly to the host.

3. The apparatus of claim 1, wherein the outernet comprises at least one router or at least one DNS server, connected indirectly to the host.

4. The apparatus of claim 1, wherein the subnet DNS searching unit comprises:
   a DNS search message creating unit for automatically creating an address of a transmitter in order to make the DNS search message;
   a DNS search message transmission unit for multicast transmitting the DNS search message to each node of the subnet; and
   a DNS search response message receiving unit for receiving a response message to the DNS search message from any node of the subnet.

5. The apparatus of claim 1, wherein the outernet DNS searching unit comprises:
   a DNS search message transmission unit for repeatedly multicast transmitting the DNS search message to each node of the outernet until a response message to the DNS search message is sent from each node, when the subnet DNS searching unit fails to receive the response message; and
   a DNS search response message receiving unit for receiving the response message from any node of the outernet.

6. The apparatus of claim 5, wherein the DNS search message transmission unit comprises:
   a hop limit setting unit for increasing a currently set hop limit by a predetermined value whenever the outernet DNS searching unit fails to receive the response message, when the subnet DNS searching unit fails to receive the response message; and a DNS search message repetition transmission unit for multicast transmitting the DNS search message to each node of the outernet based on the set hop limit until the DNS search response message receiving unit receives the response message.

7. An outernet DNS searching apparatus included in a DNS server, the apparatus comprising:
   a DNS register message creating unit for creating a DNS register message with the address of a DNS server as the address of a transmitter;
   a DNS register message transmission unit for transmitting the DNS register message to a subnet to which the DNS server belongs;
   a DNS register response message receiving unit for receiving a response message to the DNS register message from a router belonging to the subnet;
   a DNS search message receiving unit for receiving a DNS search message from the router; and
   a DNS search response message transmission unit for transmitting a response message to the DNS search message to the router.

8. The apparatus of claim 7, wherein the subnet comprises a host or at least one router, connected directly to the DNS server.

9. The apparatus of claim 7, wherein the DNS register message transmission unit transmits the DNS register message to each node of the subnet, using an anycast transmission method.

10. An apparatus for searching for a DNS server in an outernet, the apparatus being included in a router where a DNS server is registered, the apparatus comprising:
    a DNS register message receiving unit for receiving a DNS register message from a subnet to which the router belongs;
    a DNS server registering unit for registering a DNS server related to the DNS register message with the router;
    a DNS search message receiving unit for receiving a DNS search message from the subnet; and
    a DNS search message DNS server transmission unit for transmitting the DNS search message to the registered DNS server.

11. The apparatus of claim 10, wherein the subnet comprises a host, at least one subnet router, or at least one DNS server, which is connected directly to the router.

12. An apparatus for searching for a DNS server in an outernet, the apparatus included in a router where a DNS server is not registered, the apparatus comprising:
    a DNS search message receiving unit for receiving a DNS search message from a subnet to which the router belongs;
    a hop limit decreasing unit for decreasing a hop limit for the DNS search message by a predetermined value; and
    a DNS search message router transmission unit for transmitting the DNS search message with the decreased hop limit from another router belonging to the subnet.

13. The apparatus of claim 12, wherein the subnet comprises a host, at least one subnet router, or at least one DNS server, connected directly to the router.

14. An apparatus for searching for a DNS server in an outernet, comprising:
    a first outernet DNS searching unit included in a host, the first outernet DNS searching unit creating a DNS search message, transmitting the DNS search message to a first subnet, to which the host belongs, so as to receive a response message to the DNS search message, and transmitting the DNS search message to an outernet, to which the host does not belong, when the response message is not received from the first subnet;
    a second outernet DNS searching unit included in a DNS server, the second outernet DNS searching unit creating a DNS register message, transmitting the DNS register message to a second subnet to receive a response message to the DNS register message from a first router belonging to the second subnet, receiving a second DNS search message related to the DNS server from the first router, and sending a second response message to the second DNS search message to the first router;
    a third outernet DNS searching unit included in a router where a DNS server is registered, the third outernet DNS searching unit receiving a second DNS register message from the DNS server, registering the DNS server with the router, receiving a third DNS search message from the second subnet, and transmitting the third DNS search message to the registered DNS server; and
    a fourth outernet DNS searching unit included in a router where a DNS server is not registered, the fourth DNS searching unit receiving a fourth DNS search message from a third subnet, transmitting the fourth DNS search message with a hop limit to a third router belonging to the third subnet, to which a second router also belongs, and decreasing the hop limit by a predetermined value.

15. A method of searching for a DNS server in an outernet, comprising:
    creating a DNS search message, transmitting it to a subnet to which a host belongs, and receiving a response message to the DNS search message; and
    transmitting the DNS search message to an outernet to which the host does not belong when the response message is not received from the subnet, and receiving the response message from the outernet.

16. The method of claim 15, wherein the subnet comprises at least one router or at least one DNS server, connected directly to the host.

17. The method of claim 15, wherein creating a DNS search message comprises:
    automatically creating the address of a transmitter and creating the DNS search message;
    multicast transmitting the DNS search message to each node of the subnet; and
    receiving a response message to the DNS search message from any node of the subnet.

18. The method of claim 15, wherein the outernet comprises at least one router or at least one DNS server, connected indirectly to the host.

19. The method of claim 15, wherein transmitting the DNS search message to the outernet comprises:
    repeatedly multicast transmitting the DNS search message to each node of the outernet until the response message to the DNS search message is received, when the response message is not received; and
    receiving the response message from any node of the outernet.

20. The method of claim 19, wherein repeatedly multicast transmitting the DNS search message comprises:
    increasing a currently set hop limit by a predetermined value when the response message to the DNS search message is not received; and
    repeatedly multicast transmitting the DNS search message to each node of the outernet based on the set hop limit until the response message is received.

21. A method of searching for a DNS server in an outernet, the method performed by the DNS server, the method comprising:
creating a DNS register message with the address of a DNS server as the address of a transmitter;
transmitting the DNS register message to a subnet to which the DNS server belongs;
receiving a response message to the DNS register message from a router belonging to the subnet;
receiving the DNS search message related to the DNS server from the router; and
transmitting a response message to the DNS search message to the router.

22. The method of claim 21, wherein the subnet comprises a host or at least one router, connected directly to the DNS server.

23. The method of claim 21, wherein when transmitting the DNS register message to the subnet, the DNS register message is anycast transmitted to each node of the subnet.

24. A method of searching for a DNS server in an outernet, the method performed by a router where a DNS server is registered, the method comprising:
receiving a DNS register message from a subnet to which a router belongs;
registering a DNS server related to the DNS register message to the router;
receiving a DNS search message from the subnet; and
transmitting the DNS search message to the registered DNS server.

25. The method of claim 24, wherein the subnet comprises a host, at least one router, or at least one DNS server, connected directly to the router.

26. A method of searching for a DNS server in an outernet, the method performed by a router where a DNS server is not registered, the method comprising:
receiving a DNS search message from a subnet to which a router belongs;
decreasing a hop limit for the DNS search message by a predetermined value; and
transmitting the DNS search message with the decreased hop limit to another router belonging to the subnet.

27. The method of claim 26, wherein the subnet comprises a host, at least one router, or at least one DNS server, connected directly to the router.

28. A method of searching for a DNS server in an outernet, comprising:
creating a DNS search message, transmitting the DNS search message to a first subnet, to which a host belongs, so as to receive a response message to the DNS search message, and transmitting the DNS search message to an outernet, to which the host does not belong, so as to receive the response message;
creating a DNS register message, transmitting the DNS register message to a second subnet, to which a DNS server belongs, receiving a response message to the DNS register message from a first router belonging to the second subnet, receiving a DNS search message related to the DNS server from the first router, and transmitting a response message to the DNS search message to the first router;
receiving the DNS register message from the DNS server to register the DNS server to the first router, receiving a DNS search message from the second subnet, and transmitting the DNS search message to the registered DNS server; and
receiving a DNS search message from a third subnet, to which a second router belongs, transmitting the DNS search message with a hop limit to a third router, and decreasing the hop limit by a predetermined value.

29. A computer-readable medium tangibly embodying a program of instructions executable by a processor for searching for a DNS server in an outernet, comprising:
software instructions for enabling the computer to perform predetermined operations, and
a computer readable medium bearing the software instructions;
wherein the predetermined operations include:
creating a DNS search message, transmitting it to a subnet to which a host belongs, and receiving a response message to the DNS search message; and
transmitting the DNS search message to an outernet to which the host does not belong when the response message is not received from the subnet, and receiving the response message from the outernet.

30. The computer program instructions of claim 29, wherein the subnet comprises at least one router or at least one DNS server, connected directly to the host.

31. The computer program instructions of claim 29, wherein creating a DNS search message comprises:
automatically creating the address of a transmitter and creating the DNS search message;
multicast transmitting the DNS search message to each node of the subnet; and
receiving a response message to the DNS search message from any node of the subnet.

32. The computer program instructions of claim 29, wherein the outernet comprises at least one router or at least one DNS server, connected indirectly to the host.

33. The computer program instructions of claim 29, wherein transmitting the DNS search message to the outernet comprises:
repeatedly multicast transmitting the DNS search message to each node of the outernet until the response message to the DNS search message is received, when the response message is not received; and
receiving the response message from any node of the outernet.

34. The computer program instructions of claim 33, wherein repeatedly multicast transmitting the DNS search message comprises:
increasing a currently set hop limit by a predetermined value when the response message to the DNS search message is not received; and
repeatedly multicast transmitting the DNS search message to each node of the outernet based on the set hop limit until the response message is received.

35. A computer-readable medium tangibly embodying a program of instructions executable by a processor for searching for a DNS server in an outernet, the computer program product in the DNS server, comprising:
software instructions for enabling the computer to perform predetermined operations, and
wherein the predetermined operations include:
creating a DNS register message with the address of a DNS server as the address of a transmitter;
transmitting the DNS register message to a subnet to which the DNS server belongs;
receiving a response message to the DNS register message from a router belonging to the subnet;
receiving the DNS search message related to the DNS server from the router; and
transmitting a response message to the DNS search message to the router.

36. The computer program instructions of claim 35, wherein the subnet comprises a host or at least one router, connected directly to the DNS server.

37. The computer program instructions of claim 35, wherein when transmitting the DNS register message to the subnet, the DNS register message is anycast transmitted to each node of the subnet.

38. A computer-readable medium tangibly embodying a program of instructions executable by a processor for searching for a DNS server in an outernet, the computer program product in a router where a DNS server is registered, comprising:
    software instructions for enabling the computer to perform predetermined operations, and
    wherein the predetermined operations include:
    receiving a DNS register message from a subnet to which a router belongs;
    registering a DNS server related to the DNS register message to the router;
    receiving a DNS search message from the subnet; and
    transmitting the DNS search message to the registered DNS server.

39. The computer program instructions of claim 38, wherein the subnet comprises a host, at least one router, or at least one DNS server, connected directly to the router.

40. A computer-readable medium tangibly embodying a program of instructions executable by a processor for searching for a DNS server in an outernet, the computer program product in a router where a DNS server is not registered, comprising:
    software instructions for enabling the computer to perform predetermined operations, and
    wherein the predetermined operations include:
    receiving a DNS search message from a subnet to which a router belongs;
    decreasing a hop limit for the DNS search message by a predetermined value; and
    transmitting the DNS search message with the decreased hop limit to another router belonging to the subnet.

41. The computer program instructions of claim 40, wherein the subnet comprises a host, at least one router, or at least one DNS server, connected directly to the router.

42. A computer-readable medium tangibly embodying a program of instructions executable by a processor for searching for a DNS server in an outernet, comprising:
    software instructions for enabling the computer to perform predetermined operations, and
    wherein the predetermined operations include:
    creating a DNS search message, transmitting the DNS search message to a first subnet, to which a host belongs, so as to receive a response message to the DNS search message, and transmitting the DNS search message to an outernet, to which the host does not belong, so as to receive the response message;
    creating a DNS register message, transmitting the DNS register message to a second subnet, to which a DNS server belongs, receiving a response message to the DNS register message from a first router belonging to the second subnet, receiving a DNS search message related to the DNS server from the first router, and transmitting a response message to the DNS search message to the first router;
    receiving the DNS register message from the DNS server to register the DNS server to the first router, receiving a DNS search message from the second subnet, and transmitting the DNS search message to the registered DNS server; and
    receiving a DNS search message from a third subnet, to which a second router belongs, transmitting the DNS search message with a hop limit to a third router, and decreasing the hop limit by a predetermined value.

* * * * *